United States Patent
Szellos (10) Patent No.: US 9,101,183 B2
(45) Date of Patent: Aug. 11, 2015

(54) BUCKLE SYSTEM AND MOUNTING BRACKET

(76) Inventor: David Szellos, Toronto (CA)

( * ) Notice: Subject to any disclaimer, the term of this patent is extended or adjusted under 35 U.S.C. 154(b) by 159 days.

(21) Appl. No.: 13/825,640

(22) PCT Filed: Sep. 13, 2011

(86) PCT No.: PCT/CA2011/001041
§ 371 (c)(1),
(2), (4) Date: May 7, 2013

(87) PCT Pub. No.: WO2012/037647
PCT Pub. Date: Mar. 29, 2012

(65) Prior Publication Data
US 2013/0227824 A1 Sep. 5, 2013

Related U.S. Application Data

(63) Continuation of application No. 12/891,883, filed on Sep. 28, 2010, now abandoned, and a continuation of application No. 12/889,944, filed on Sep. 24, 2010, now abandoned.

(51) Int. Cl.
| | |
|---|---|
| A44B 11/25 | (2006.01) |
| F16M 11/04 | (2006.01) |
| F16M 13/00 | (2006.01) |
| F16M 13/04 | (2006.01) |

(52) U.S. Cl.
CPC ............... *A44B 11/25* (2013.01); *A44B 11/258* (2013.01); *F16M 11/041* (2013.01); *F16M 13/00* (2013.01); *F16M 13/04* (2013.01); *Y10T 24/407* (2015.01)

(58) Field of Classification Search
CPC .. A44C 5/2042; A44C 5/2019; A44C 5/2052; A44C 5/2071; A44C 7/00; A44C 9/0046; A44B 11/005; A44B 11/25; A44B 11/2569; A44B 99/00; Y10S 24/52; Y10S 24/54; Y10S 24/906
USPC .................... 24/68 J, 71 J, 190, 191, 265 WS
See application file for complete search history.

(56) References Cited

U.S. PATENT DOCUMENTS

| | | | |
|---|---|---|---|
| 3,043,037 A | | 7/1962 | Lesser et al. |
| 3,404,440 A | * | 10/1968 | Weiss ........................ 24/601.5 |
| 3,999,251 A | | 12/1976 | Payant |

(Continued)

OTHER PUBLICATIONS

International Search Report mailed Dec. 19, 2011.

*Primary Examiner* — Robert J Sandy
*Assistant Examiner* — David Upchurch
(74) *Attorney, Agent, or Firm* — Riches, McKenzie & Herbert, LLP (57) ABSTRACT

A buckle system is provided having a mounting bracket and a mounting clip. The mounting bracket includes a bracket body, a slot and a groove and has a first surface and a second surface opposite the first surface, with the slot and the groove formed in the bracket body. The mounting clip includes a clip body, a latching mechanism and a tongue. The clip body is connected to the latching mechanism by the tongue, which is slid into the groove formed in the bracket body of the mounting bracket such that the latching mechanism is adjacent the first surface of the bracket body and the clip body is adjacent the second surface of the bracket body. A hook of the latching mechanism is received by the slot formed in the bracket body once the tongue of the mounting clip is slideably received into the groove of the mounting bracket.

4 Claims, 6 Drawing Sheets

(56) References Cited

U.S. PATENT DOCUMENTS

| | | | |
|---|---|---|---|
| 4,307,954 A | 12/1981 | Ludwig | |
| 4,394,808 A | 7/1983 | Thorsell | |
| 4,539,736 A * | 9/1985 | Yokosuka | 24/644 |
| 4,593,440 A * | 6/1986 | Tsamas | 24/265 WS |
| 4,660,953 A | 4/1987 | Fuchi | |
| 4,886,297 A | 12/1989 | Levine | |
| 4,928,359 A * | 5/1990 | Gagnebin | 24/71 J |
| 5,113,556 A | 5/1992 | Murai et al. | |
| 5,182,837 A | 2/1993 | Anthony et al. | |
| 5,274,890 A | 1/1994 | Shimizu et al. | |
| 5,554,503 A | 9/1996 | Down et al. | |
| 5,826,309 A * | 10/1998 | Tsamas | 24/68 J |
| 5,865,562 A | 2/1999 | Mallek | |
| 6,481,069 B1 | 11/2002 | Cheng | |
| 6,893,282 B2 | 5/2005 | Schadhauser | |
| 7,334,433 B1 * | 2/2008 | Fuhrman et al. | 63/3.1 |
| 7,496,994 B1 * | 3/2009 | Headley | 24/303 |
| 7,797,803 B2 | 9/2010 | Falb et al. | |
| 7,878,024 B2 * | 2/2011 | Baik | 63/12 |
| 2003/0140461 A1 * | 7/2003 | Wilcock | 24/191 |
| 2010/0008514 A1 * | 1/2010 | Bates et al. | 381/77 |
| 2010/0122411 A1 | 5/2010 | McLeod | |
| 2011/0274303 A1 * | 11/2011 | Filson et al. | 381/332 |

* cited by examiner

BUCKLE SYSTEM AND MOUNTING BRACKET

CROSS-REFERENCE TO RELATED APPLICATIONS

The present application claims priority from U.S. application Ser. No. 12/889,944 filed Sep. 24, 2010 and U.S. application Ser. No. 12/891,883 filed Sep. 28, 2010, the teachings of which are hereby incorporated by reference in their entirety.

FIELD OF THE INVENTION

This invention relates to a buckle system and more particular to a buckle system having mounting clip and a mounting bracket.

BACKGROUND OF THE INVENTION

Buckles are well-known devices for connecting and securing objects. Many well-known buckle designs have been previously described.

A simple patent by Payant (U.S. Pat. No. 3,999,251) illustrates the three parts of a buckle. Payant describes an invention with a belt tongue and a buckle bracket and a locking device.

Coupling patents that describe a tongue passing into a bracket include Mallek (U.S. Pat. No. 5,865,562), Mcleod (U.S. Patent Publication No. 2010/0122411) and Levine (U.S. Pat. No. 4,886,297). Mallek describes a tongue for attachment of dry wall that inserts into a bracket affixed to a substrate. McLeod describes a tongue that fits into a tieplate within a bath. Furthermore, Levine describes a skateboard bracket employing a tongue inserted into a bracket. As illustrated in the prior art, it is known that complementary shape couplings are prone to failure if torque is applied to the base of the tongue perpendicular to the axis of insertion. Furthermore, the cited couplings are prone to failure if a withdrawal force is applied to the tongue, as the cited couplings employ a variety of weak linear locking mechanisms.

Another buckle principle is a locking mechanism. The function of stabilization of the coupling of a tongue and a bracket by means of a more sophisticated locking device acting perpendicular to the line of draw of the tongue has been developed in the class of coupling mechanisms called bayonet mounts. Imanari et al. (U.S. Pat. No. 5,554,503) describes a bayonet mount for a camera lens that uses the bayonet mount to engage bayonet tabs into the mount main body. Ludwig (U.S. Pat. No. 4,307,954) and Fuchi (U.S. Pat. No. 4,660,953) further employ a plurality of tabs on the lens marginal portion to permit the lens to be axially inserted into the body opening. However, a disadvantage of bayonet mounts is the space occupied by the mount itself. A circular tongue results in a coupling requiring a large volume.

Prior art attempting to overcome the deficiencies of bayonet mounts is described in Shadhauser (U.S. Pat. No. 6,893,282), which uses a rectangular tongue in combination with a circular tongue. When the rectangular tongue is inserted the groove, it is rotated to provide a locking mechanism that is perpendicular to the line of draw. However, as with most bayonet mounts, the tongue can be withdrawn easily once the bayonet mount is rotated back to an orientation aligning the tongue with the groove.

Rotation in locks can also be seen in seatbelt buckles such as described in Thorsel (U.S. Pat. No. 4,394,808). The tongue in this case is a flat spring that clips against the bracket by virtue of a ramp and a release feature. Although the tongue is removable, the strength of the locking mechanism is only as strong as the spring in the tongue. Application of a force or a torque to the base of the tongue will also rotate the clip feature of the tongue to be less than perpendicular to the locking feature of the bracket. This leads to a failure in the coupling when the strength of the spring becomes less than that of the force applied.

Improved seatbelts and belt mechanisms are described in Falb et. al (U.S. Pat. No. 7,797,803), Shimizu (U.S. Pat. No. 5,274,890) and Murai (U.S. Pat. No. 5,113,556). However, a common problem with the disclosed belt mechanisms is the lack of internal stability afforded by an internal locking mechanism between a guiding open track and an immovable feature of the bracket. While Murai uses a track open at the insertion end of the tongue whose axis is parallel to the axis of insertion, the coupling is weakened by integrating the locking mechanism into the tongue. Accordingly, there is a need for a buckle system that provides strong support in a multitude of directions and which is not susceptible to separation without specific action taken by the user. Furthermore, there is a need for the buckle system to be compact and without requiring undue size or wasted space. Finally, an efficient buckle system is desired for use with portable electronic devices.

SUMMARY OF THE INVENTION

The present invention provides a buckle system having a mounting clip and a mounting bracket. It is an object of this invention to overcome at least some of the deficiencies in the prior art.

Buckles make use of a plurality of devices to fasten a mounting clip and a mounting bracket. Challenges in buckle design include low profile and easy orientation and strength against separation of the two pieces. The strongest coupling is seen in the rotational bayonet mount where the axis of insertion is parallel to the axis of rotation of the projection stop. Bayonet couplings have this feature but suffer from a large profile. Accordingly, the present invention recognizes some of the disadvantages of the prior art such as the large profile of bayonet couplings, including its large size and inefficient use of space.

In one aspect, the present invention may reside in a buckle system having a mounting bracket and a mounting clip. The mounting bracket may include a bracket body, a slot and a groove. The bracket body may have a first surface and a second surface opposite the first surface, and the slot and the groove may be formed in the bracket body. The mounting clip may include a clip body, a latching mechanism and a tongue for mechanically coupling to the mounting bracket. The clip body may be connected to the latching mechanism by the tongue. The tongue of the mounting clip may be operable to slide into the groove formed in the bracket body of the mounting bracket such that the latching mechanism is adjacent the first surface of the bracket body and the clip body is adjacent the second surface of the bracket body opposite the first surface. Finally, a hook of the latching mechanism may be operable to be received by the slot formed in the bracket body once the tongue of the mounting clip is slideably received into the groove of the mounting bracket.

In another aspect, the present invention may reside in a mounting bracket for mating with a mounting clip having a bracket body, a groove and a slot. The bracket body may be operable to mechanically couple to the mounting clip where the mounting clip has a clip body and a latching mechanism connected to the clip body by a tongue. The bracket body may have a first surface and a second surface opposite the first surface. The groove in the bracket body may be operable to slideably receive the tongue of the mounting clip. The groove may be spaced towards a first end of the bracket body. The slot in the bracket body may be operable to receive a hook of the latching mechanism. The slot may be spaced towards a second end of the bracket body.

One advantage of the present invention is that the strength of bayonet mounts may be incorporated into the described embodiments, while a projecting feature of the mounting clip is able to engage a slot in the mounting bracket in a manner that lessens the profile of the buckle system. A hook is provided in the buckle system that secures to the slot through a rotation of the latching mechanism around an axis that is parallel to the insertion of the tongue into the bracket body. This coupling is both strong and low in profile. A further reduction in profile is enabled by the provision of the groove in the bracket body itself to allow rotation of the latching mechanism, about the tongue position, once inside the groove.

Another advantage of the buckle system is the ease of mating the mounting clip with the mounting bracket. The coupling is exploited to improve mating the two pieces together. In operation, the tongue of the mounting clip is guided into the groove in the mounting bracket. Once the tongue is slideably received into the groove, the hook of the mounting clip is inserted into the slot of the mounting bracket to latch the two components together. These two complementary pairs mate the mounting clip to the mounting bracket and provide strength to the buckle system.

Strength in the buckle system is also achieved through the complementary shapes of the mounting clip and mounting bracket. Matching the shapes of the coupling pieces allows the forces exerted on the mounting clip and mounting bracket to be shared across the entire volume of the buckle system.

Yet another advantage of the present invention is the resistance to separation of the mounting clip from the mounting bracket in any single direction. Because separating the mounting clip from the mounting bracket requires two separate, independent movements, i.e. a lifting of the hook from the slot in one direction and the sliding of the tongue out of the groove in a separate and different direction, a force in any one direction will not separate the two components. Accordingly, as the direction for tongue insertion into the groove and the orientation of the axis of rotation of the protruding hook are parallel, additional strength against torque perpendicular to the base of the tongue can be provided in the construction of the mounting clip and mounting bracket. Furthermore, the independent nature of the two separating motions is enhanced as the slot in the mounting bracket is distinct and independent from the groove and therefore the forces acting on either the slot or the groove are at different locations on the bracket body.

While the buckle system may be used in a number of different embodiments, the inventor has appreciated that a strong, low-profile buckle system is especially desirable for use with computers and, more particularly, portable media devices. In a preferred embodiment, the inventor has appreciated that a low-profile mounting bracket could be incorporated with a watch strap such that, when coupled to a portable media player, the mounting bracket and portable media player combination may be worn as a bracelet or a watch.

Further and other features of the invention will be apparent to those skilled in the art from the following figures and detailed description of the embodiments thereof.

BRIEF DESCRIPTION OF THE DRAWINGS

Reference may now be had to the following detailed description taken together with the accompanying drawings in which.

DETAILED DESCRIPTION OF THE PREFERRED EMBODIMENTS

Figure 1:
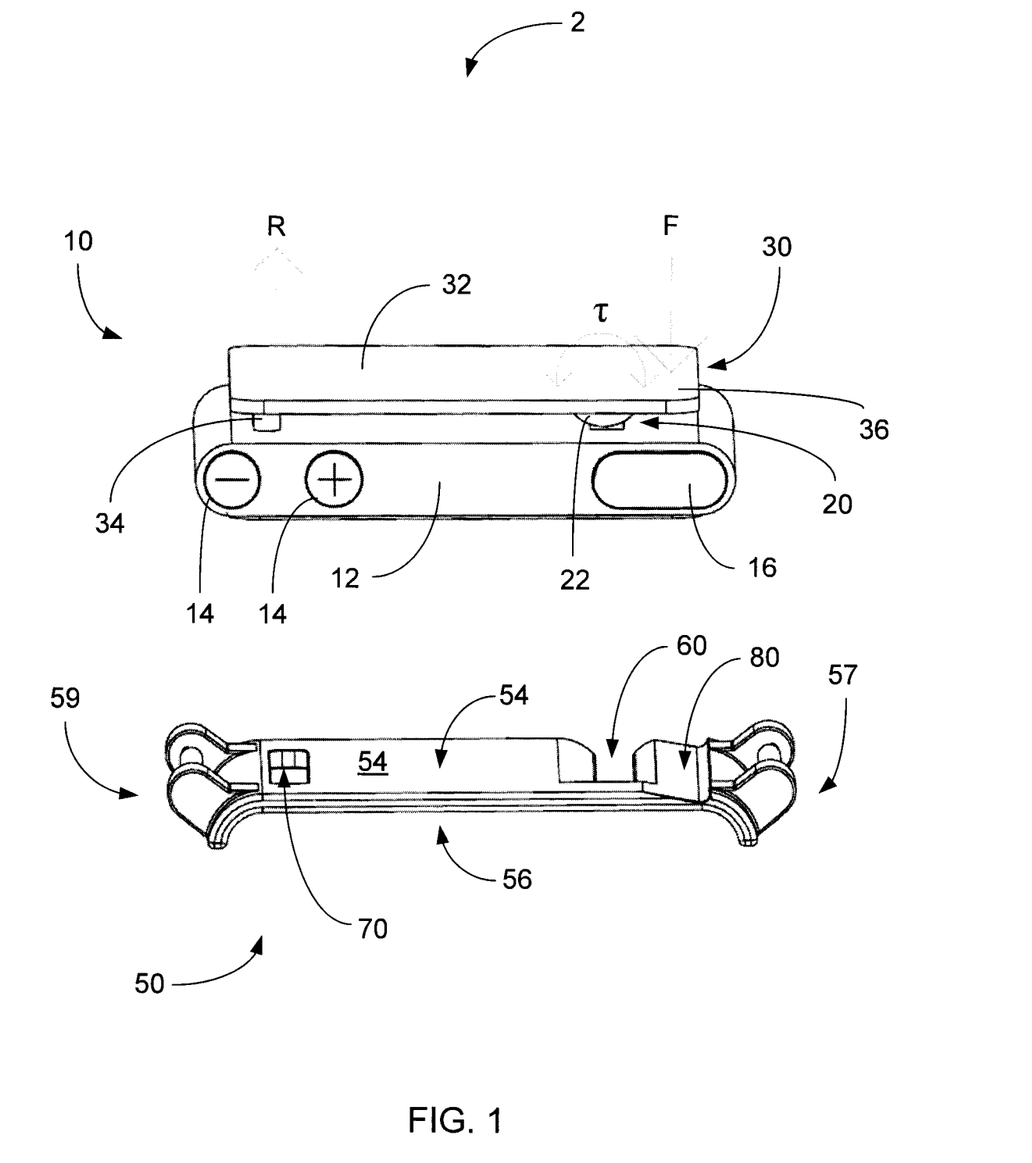
FIG. 1 shows an exploded view of a buckle system in accordance with an embodiment of the present invention.

An exploded view of a buckle system 2 is provided in FIG. 1. The buckle system 2 is formed by a mounting clip 10 mating with a mounting bracket 50.

The mounting clip 10 is configured with a clip body 12, a tongue 20 and a latching mechanism 30. The clip body 12 is mechanically coupled to the latching mechanism 30 by the tongue 20. For example, at least part of the tongue 20 may be formed as a joint connecting the latching mechanism 30 to the clip body 12.

In a preferred embodiment, the tongue 20 connecting the latching mechanism 30 to the clip body 12 is spaced towards one end of the latching mechanism 30. The latching mechanism 30 is configured with a lever 32 and a hook 34. The lever 32 is operable to rotate or pivot about an axis or a fulcrum (not shown) defined by the tongue 20. A tongue end 36 is on one side of the lever 32 and the hook 34 is spaced towards the other side of the lever 32, with the tongue 20 coupling to the lever 32 between the tongue end 36 and the hook 34.

In another preferred embodiment, moving the tongue end 36 of the lever 32 is operable to control the position of the hook 34. When the tongue end 36 is biased towards the clip body 12, the lever 32 rotates about the axis or joint defined by the tongue 20. When the tongue end is 36 depressed, the end of the lever 32 with the hook 34 is raised. Furthermore, when the hook 34 is raised, the latching mechanism 30 may be said to be in the 'open position'. Similarly, when the tongue end 36 is released or when the tongue end 36 of the lever is not biased towards the clip body 12, the latching mechanism 30 may be said to be in the 'closed position'. Preferably, a spring 22 may be used to bias the latching mechanism 16 into the closed position. For example, if the tongue end 36 is biased by a force F provided by a user's finger (not shown), the latching mechanism 30 will return to the closed position due to the torque $\tau$ provided by the spring 22, once the force F has been removed. It should be understood that different types of springs or equivalents may be used to provide different amounts of torque $\tau$ about the axis of rotation.

The hook 34 of the latching mechanism 30 is connected to the lever 32. As described above, the hook 34 may be spaced away from the tongue end 36 of the lever. In a preferred embodiment, the hook 34 is connected to an underside of the lever 32 such that the hook is adjacent the clip body 12 when the latching mechanism 30 is in a closed position. In some embodiments, the hook 34 may be in direct contact with the clip body 12 when in a closed position. For example, if a spring 22 is used to bias the latching mechanism 30 into the closed position, the hook 34 may provide a reaction force R to counteract the torque τ provided by the spring 22 when in contact with the clip body 12.

The mounting bracket 50 is configured with a bracket body 52, a groove 60 and a slot 70. The groove 60 and the slot 70 are formed in the bracket body 52. Furthermore, the bracket body 52 may be generally planar and the bracket body 52, groove 60 and slot 70 may be generally formed in the same plane.

The bracket body 52 may be defined by a first surface 54 and a second surface 56, opposite to the first surface 54. Furthermore, the bracket body 52 may be defined by a first end 57 and a second end 59. In a preferred embodiment, the groove 60 is spaced towards the first end 57 of the of the bracket body 52. Furthermore, the slot 70 may be spaced towards the second end 59. In general, the orientations of the slot 70 and the groove 60 may be aligned. For example, the lengths of the slot 70 and the groove 60 may be substantially parallel.

A depression 80 may be formed in the bracket body 52. The depression 80 may be spaced towards the first end 57 such that the groove 60 is located between the slot 70 and the depression 80, with the depression 80 adjacent to the groove 60.

To mate the mounting clip 10 with the mounting bracket 50 in the buckle system 2, the latching mechanism 30 is first biased into the open position. The tongue 20 of the mounting clip 10 is then slid into the groove 60 of the mounting bracket 50 such that latching mechanism 30 is adjacent the first surface 54 of the bracket body 52 and the clip body 12 is adjacent the second surface 56 of the bracket body 52.

Once the tongue 20 is slideably received into the groove 60, the bracket body 52 of the mounting bracket 50 is located between the latching mechanism 30 and clip body 12 of the mounting clip 10. Subsequently, the latching mechanism 30 is biased into the closed position such that the hook 34 of the latching mechanism 30 is inserted into the slot 70 formed in the bracket body 52 of the mounting bracket 50. If a spring 22 is used, the force F is removed and the torque τ of the spring 22 is operable to force the hook 34 into the slot 70.

Figure 2:
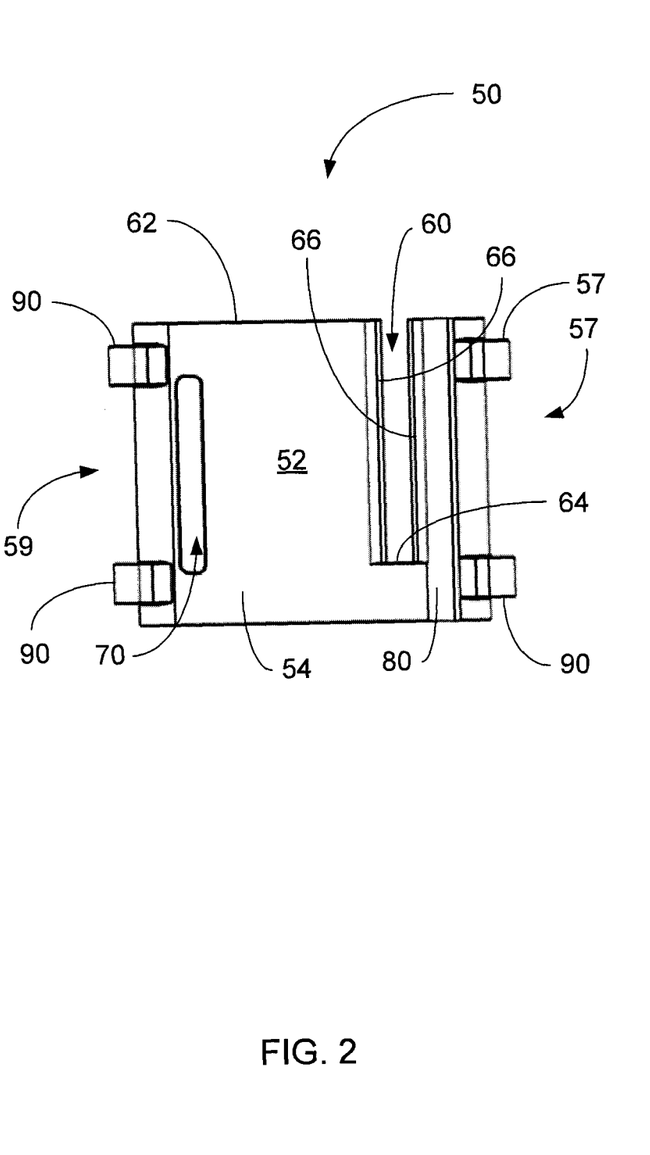
FIG. 2 shows a bottom view of a mounting bracket in accordance with an embodiment of the present invention.

Referring now to FIG. 2, a top view of the mounting bracket 50 is shown. The first surface 52 is also shown with the groove 60, slot 70 and depression 80, illustrated in a preferred embodiment.

The groove 60 of the mounting bracket 50 is formed in a side of the bracket body 52. The groove 60 may cut into the bracket body 52 from a side edge 62 to an interior edge 64 of the bracket body 52. The groove 60 is also formed from the first surface 54 of the bracket body 52 to the second surface 56. The groove 60 acts as a guide or a track to allow the tongue 20 to be slideably received by the mounting bracket 50.

In some embodiments groove edges 66 may transition from the bracket body 52 to the groove 60. Furthermore, the groove edges 66 may be on the first surface 54 and/or the second surface 56 of the bracket body 52. The groove edges 66 may be configured to provide additional stability and support to the mounting clip 50 when mated to the mounting bracket 50. For example, the groove edges 66 may be shaped to provide broad and consistent contact with the tongue 20 of the mounting clip 10 when the tongue 20 is slideably received into the groove 60. Such broad and consistent contact may reduce any relative motion (i.e. as provided by non-optimal contact or wiggle room) between the mounting clip 10 and the mounting bracket 50 when mated, such that the buckle system 2 is mechanically coupled together and behaves as a single piece.

The slot 70 of the mounting bracket 50 may be spaced towards the second end 59 of the bracket body 52. The slot 70 is operable to receive the hook 34 when the latching mechanism 30 is in the closed position. In a preferred embodiment, the slot 70 is formed as an aperture extending from the first surface 54 to the second surface 56 of the bracket body 52. The shape of the slot 70 may be generally rectangular, with the orientation of the slot 70 parallel to the groove 60. As with the tongue 20 and groove 60, the hook 34 and slot 70 are generally complementary. A strong coupling is provided by the complementary shapes such that any forces are easily transferred between the mounting clip 10 and the mounting bracket 50.

It should be understood that other configurations for the slot 70 and hook 34 are possible. For example, the slot 70 may not extend through the entire bracket body 52. Instead, the slot 70 may be a cavity, an indentation and the like; extending partially, but not entirely, through the bracket body 52. In another embodiment, multiple slots and multiple hooks may be used in any number of orientations, where each of the hooks is operable to be received by a complementary slot.

Figure 5A:
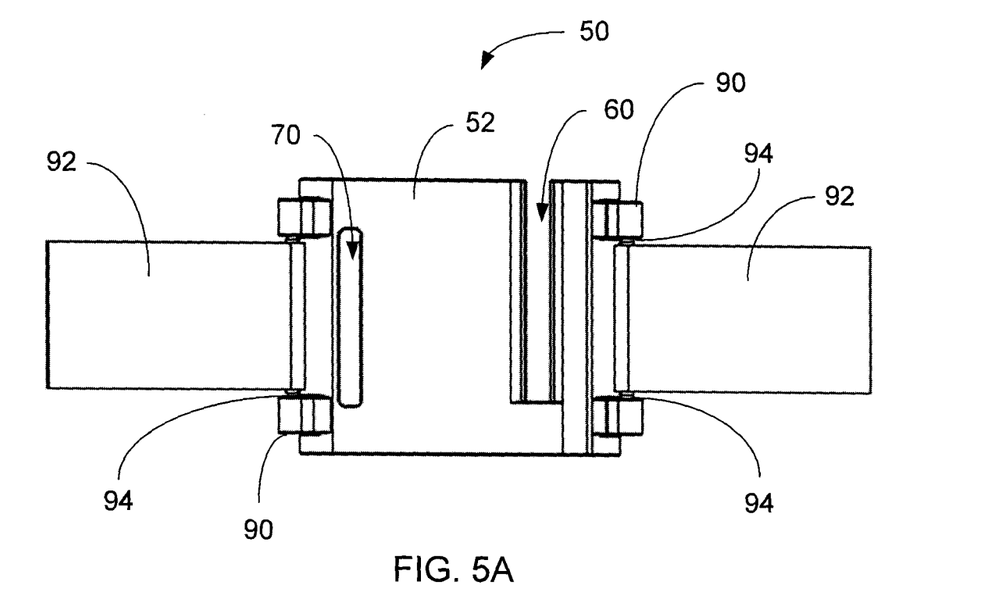
FIG. 5A shows a bottom view of the mounting bracket of FIG. 4.
Figure 5B:
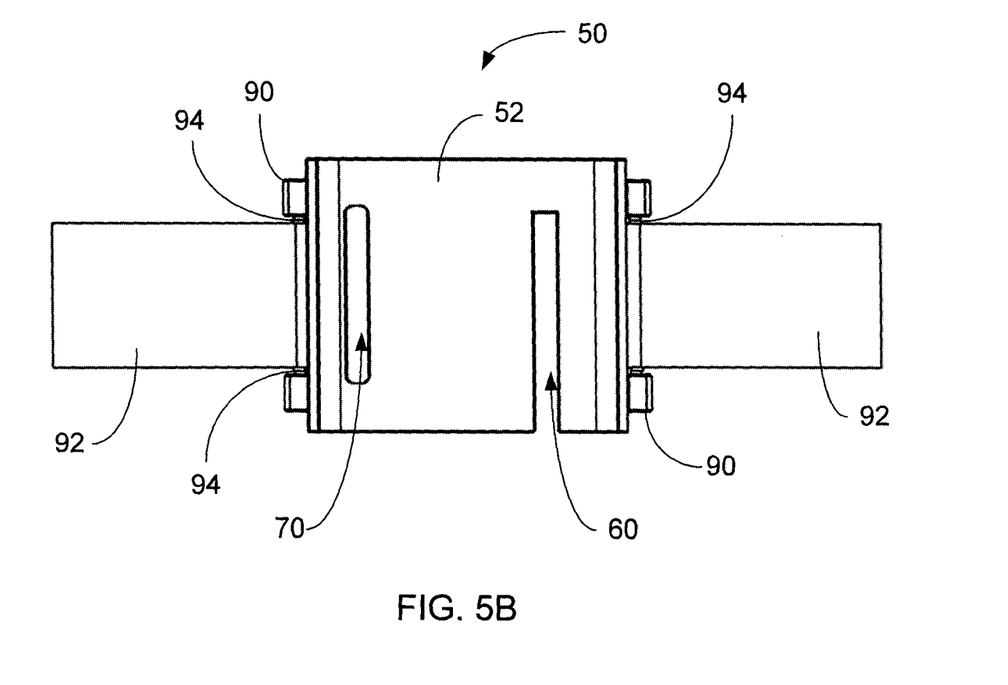
FIG. 5B shows a top view of the mounting bracket of FIG. 4.

In some embodiments, the mounting bracket 50 is configured with one or more coupling devices 90. The coupling devices 90 are operable to connect the mounting bracket to peripheral devices (not shown). For example, referring briefly to FIG. 5, the coupling devices 90 are used to connect the mounting bracket 50 to one or more watch straps 92. In another embodiment, the coupling device 90 may connect the mounting clip 50 to a pendent, necklace, belt, bag, and the like. It should be understood that other types of coupling devices 90 are possible to couple the buckle system 2 to other peripheral devices.

Figure 3:
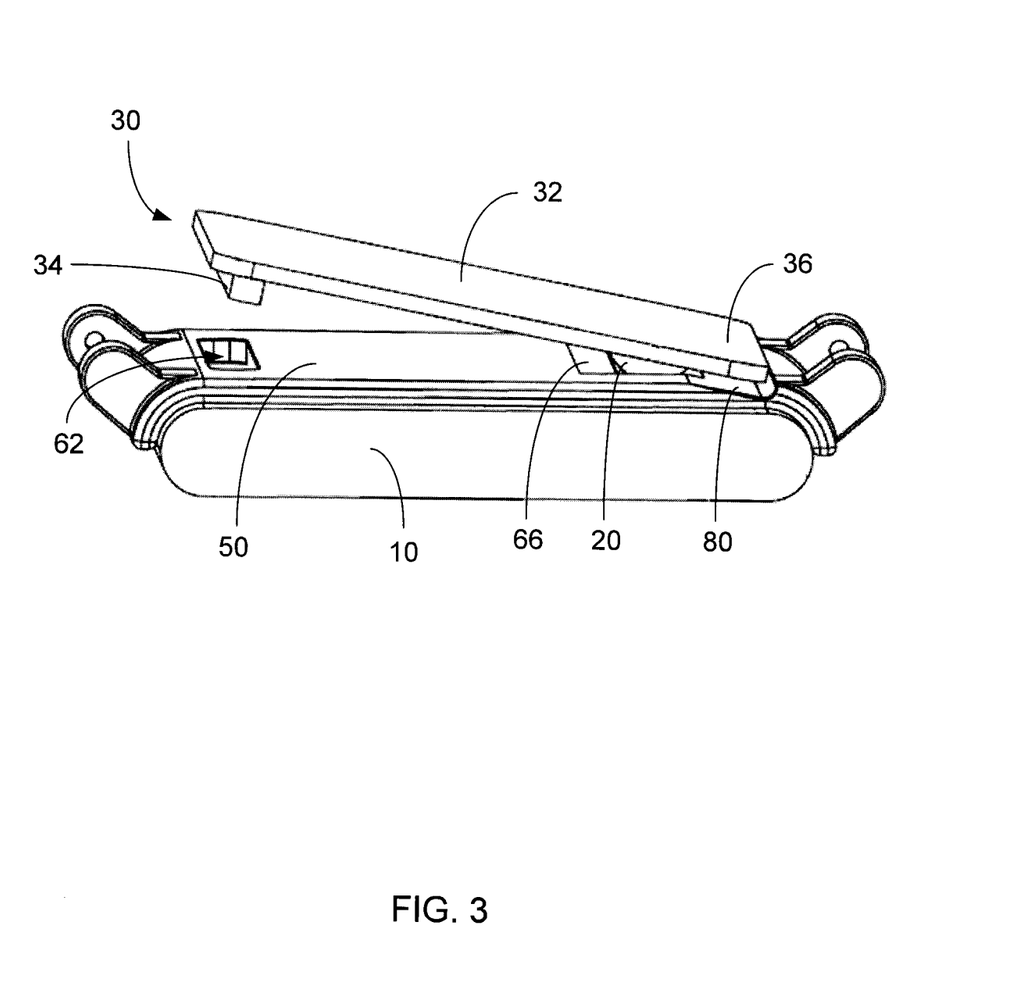
FIG. 3 shows the buckle system with a mounting clip in an open position in accordance with an embodiment of the present invention.

Referring now to FIG. 3, the buckle system 2 is shown with the mounting clip 10 partially mated to the mounting bracket 50 and the mounting clip 10 biased in the open position. The tongue end 36 of the latching mechanism 30 is biased towards the bracket body 52 with the hook 34 biased away from the clip body 12. Furthermore, the tongue 20 of the mounting clip 10 is slideably received within the groove of the 60 of the mounting bracket 50. When the latching mechanism 30 of the mounting clip 10 is subsequently unbiased or moved to the closed position, the hook 34 is inserted into the slot 70, mating the mounting clip 10 to the mounting bracket 50.

As shown in FIG. 3, the hook 34 of the mounting clip 10 and the slot 60 of the mounting bracket 50 may be complementary. The shape of the hook 34 may complement the shape of the slot 70 to provide a strong coupling, free from relative motion. For example, the hook 34 illustrated in FIG. 3 is a rectangular protrusion. Accordingly, the shape of the slot 70 is such that the hook 34 is received into a matching rectangular cavity.

Although the hook 34 is shown as a rectangular protrusion on the underside of the lever 32, it should be understood that other shapes are possible. For example, a wedge or other geometric and non-geometric shapes may be used. Furthermore, the hook 34 may have a catch mechanism (not shown) to grab or snap into the slot 70 or bracket body 52 of the mounting bracket 50. Other, more elaborate hook and slot (or even hook and loop) configurations are also possible. The shape of the hook 34 and complementary slot 70, illustrated in the preferred embodiments, should not be construed as limiting.

Once mechanically coupled in the buckle system 2, the complementary hook 34 and slot 70 and the complementary tongue 20 and groove 60 provide support to the buckle system 2 and resist separation. The matching hook 34 and slot 70 are operable to resist the sliding motion required to remove the tongue 20 from the groove 60. Similarly, the placement of the tongue 20 within the groove 60 and the placement of the bracket body 52 between the latching mechanism 30 and clip body 12 are operable to resist the motion necessary to lift the hook 34 out of the slot 70.

To separate the mounting clip 10 from the mounting bracket 50 in the buckle system 2, the order of steps are reversed. To begin with, the hook 34 must first be removed from the slot 70. To do this, the tongue end 36 of the latching mechanism 30 may be biased towards the clip body 12, thereby rotating the lever 32 about the fulcrum defined by the tongue 20 and lifting the hook 34 out of the slot 70. Once removed, the tongue 20 of the mounting clip 10 can be slid out of the groove 60 and separated from the mounting bracket 50.

As shown in FIG. 3, the depression 80 in the first surface 54 of the bracket body 52 is complementary to the path taken by the tongue end 36 of the latching mechanism 30, when in the open position. The depression 80 may provide additional clearance for the tongue end of the lever 32 to provide the latching mechanism 30 a greater range of motion. The depression 80 is also operable to allow the mounting clip 10 to remain in the open position such to slide the tongue 20 of the mounting clip 10 into the groove 60 while simultaneously providing clearance for the hook 34 to pass over the bracket body 52 without hindrance and to align the hook 34 over the slot 70.

Similarly, the depression 80 is operable to allow for an increase in an angle α formed between the latching mechanism 30, the tongue 20 and the bracket body 52, when in the open position, by providing clearance for the tongue end 36 of the latching mechanism 30. As seen in FIG. 3, at least part of the depression 80 is wedge-shaped and conforms to the path taken by the tongue end 36 when biased from the closed position into the open position. Furthermore, the depression 80 is asymmetric about a central transverse axis, parallel to the axis of rotation of the lever 32, and runs deeper into the first surface 54 of the bracket body 52 on a side of the transverse axis spaced towards the first end 57 of the bracket body 52. It should be understood that other configurations for the depression 80 are also possible.

As also shown in FIG. 3, the second surface 56 (seen in FIG. 1) of the mounting bracket 50 conforms to the shape of the mounting clip 10 when mated. This may add additional support and stability to the buckle system 2 by providing a large surface area for transferring forces back and forth between the mounting clip 10 and the mounting bracket 50. Although the bracket body 52 is generally planar, the first end 57 and the second end 59 may cup the mounting clip 10 and aid the alignment of the tongue 20 with the bracket body 52 when sliding into the groove 60.

As previously discussed, the bracket body 52 generally extends along a plane. Referring once again to FIG. 2, the body plane is defined by side edge 62 and the first end 57 and the second end 59 of the bracket body 52. As the groove 60 is cut into the bracket body 52, the tongue 20 of the mounting clip 10 is slideably received into the groove 60 from a tongue direction. This tongue direction is generally defined from the entrance of the groove 60 along the side edge 62 to the interior edge 64 of the bracket body 52. Furthermore, the length of the groove 60 is defined by the tongue direction (i.e. from the entrance of the groove to the interior edge 64). The tongue direction is in, or at least generally parallel to, the body plane of the bracket body 52. Furthermore, the tongue direction, length of the groove 60, and length of the slot 70 are generally parallel.

The hook 34 is inserted into the slot 70 of the bracket body 52 in a different plane than the tongue direction, when the latching mechanism 30 is biased into the closed position. In a preferred embodiment, the hook direction is orthogonal to the body plane. However, in other embodiments, at least a component of the hook direction is orthogonal to the body plane.

Coupling or mating the mounting clip 10 and the mounting bracket 50 simultaneously from two different directions provides additional support and stability to the buckle system 2. Because two independent motions are required to separate the buckle system 2, unwanted separation of the mounting clip 10 to the mounting bracket 50 is hindered. Instead, two independent motions must be consciously executed by a user in order to separate the mounting clip 10 and the mounting bracket 50.

Referring back to FIG. 3, when the latching mechanism 30 is in the closed position, separation of the mounting clip 10 from the mounting bracket 50 in a direction along the body plane is resisted by the groove 60 and the slot 70. In three directions within the body plane, any motion by the groove 60 is physically opposed by the tongue 20 of the mounting clip 10. In the fourth direction, where the tongue 20 is operable to slide out of and along the groove 60, the mounting clip 10 is held in place by the complementary hook 34 and slot 70.

Similarly, the tongue 20 and groove 60 physically oppose any separation of the mounting clip 10 from the mounting bracket 50 in a direction orthogonal to the body plane such to remove the hook 34 from the slot 70. As the complementary groove 60 and tongue 20 mechanically couple the mounting clip 10 to the mounting bracket 50 such that groove 60 is in mechanical communication, on either side, by both the latching mechanism 30 and the clip body 12, the mounting clip 10 is incapable of separating from the mounting bracket 50 in a direction orthogonal to the body plane.

Furthermore, the complementary shapes of the mounting clip 10 with the mounting bracket 50 and the tongue 20 with the groove 60 (and groove edges 66) may reduce the relative motions of the components of the buckle system 2, when mated. Properly designed and constructed, any wiggling or give between the mounting clip 10 and the mounting bracket 50 may be reduced or eliminated.

Figure 4:
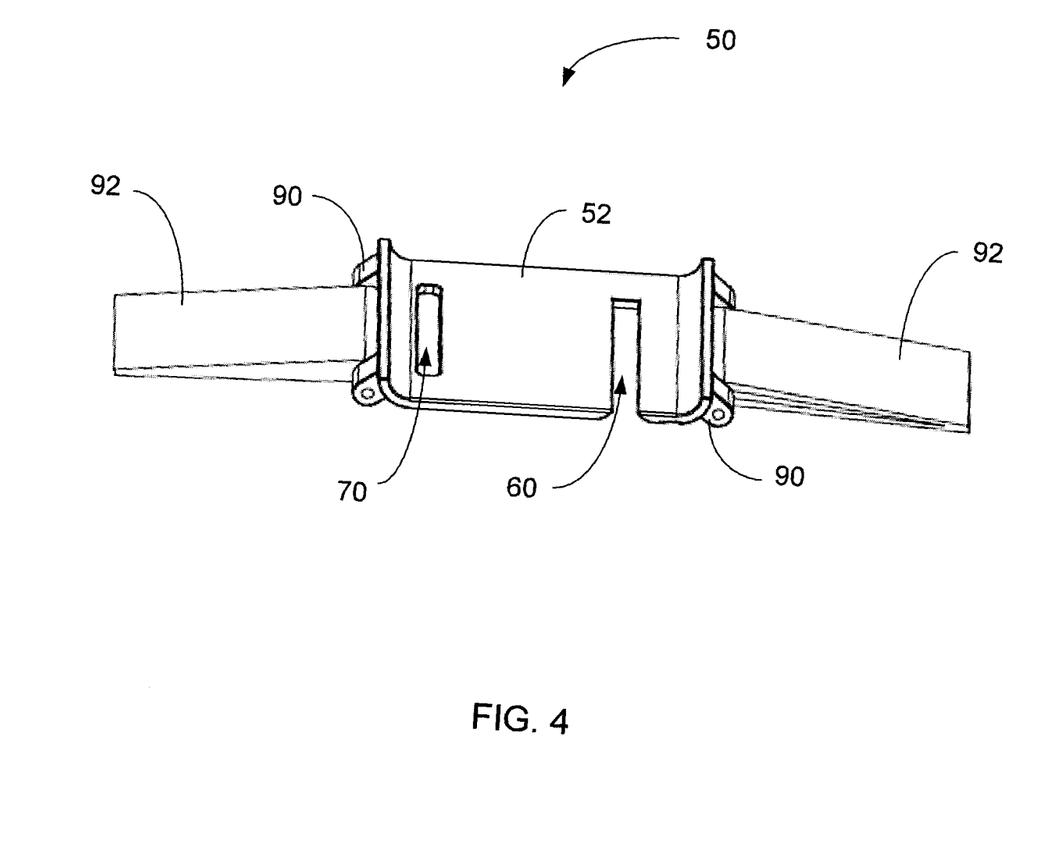
FIG. 4 shows an isometric top view of a mounting bracket with corresponding watch straps in accordance with an embodiment of the present invention.

Turning now to FIG. 4, the buckle system 2 may form part of a watch, as shown in a preferred embodiment. Watch straps 92 are connected to either end of the mounting bracket 50 by coupling devices 90.

As better seen in a top view of the mounting bracket 50 in FIG. 5A and a bottom view in FIG. 5B, the watch straps 92 may include coupling mechanisms 94 to cooperatively mate with the two pairs of coupling devices 90. For example, the coupling mechanisms 94 may include a spring-loaded male component (not shown) which enters a female portion (not shown) of each of the coupling devices 90. Furthermore, the spring-loaded male component may straddle the entire width of the watch strap 92 and may use a single mechanism to mechanically secure the watch strap 92 to the mounting bracket 50. Other coupling mechanisms 94 are also possible to allow the watch straps 92 (or other peripheral devices) to be connected to the bracket body 52 via the coupling devices 90.

In another preferred embodiment, the clip body 12 of the mounting clip 10 may include a computer. Furthermore, in a more preferred embodiment, the mounting clip 10 may include a portable media player such as an iPod nano mobile digital device, and the like. iPod and iPod nano are trademarks of Apple, Inc., registered in the U.S. and other countries. Accordingly, the groove 60 and slot 70 of the mounting bracket 50 may be configured to mate with components of the computer or portable media player. Further examples of a computer may include a mobiles phone, a personal digital assistant (PDA), a watch, a portable music player such as an MP3 player, a global positioning system (GPS) device, and the like. Other types of electronic and non-electronic devices may be incorporated into the mounting clip 10.

If a computer or portable media player is operable to mate with the mounting bracket 50, the computer or portable media player may have components corresponding to the clip body 12, tongue 20, latching mechanism 30, hook 34, and the like of the mounting clip 10. The mounting bracket 50 may be operable to mate with the computer or portable media player in a manner described above with respect to the mounting clip 10.

Figure 6:
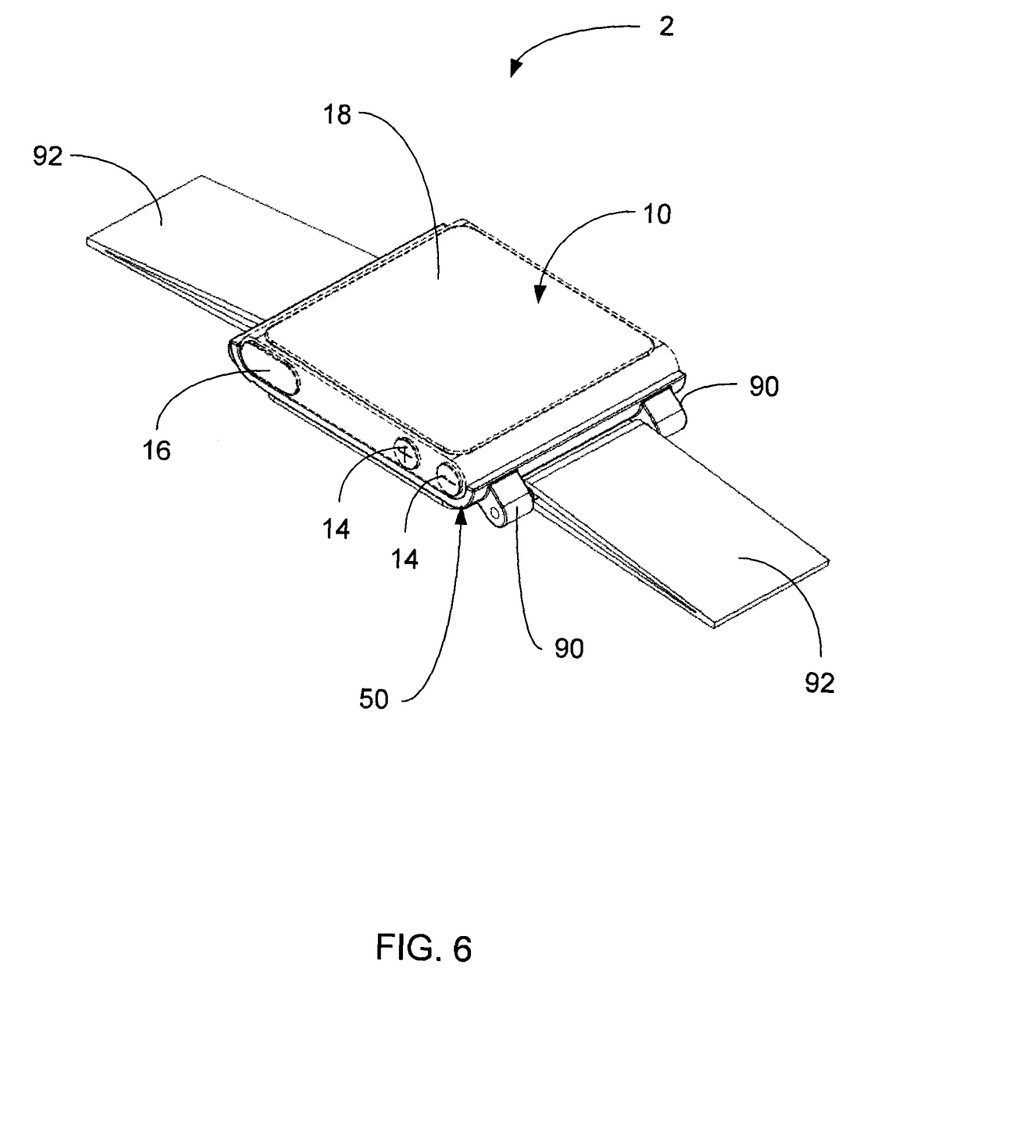
FIG. 6 shows an isometric top view of the buckle system where the mounting clip is a portable media player in accordance with an embodiment of the present invention.

Referring now to FIG. 6 the mounting clip 10 comprises a portable media player such as an iPod nano (trade-marked) mobile digital device and is mated to the mounting bracket 50 to form the buckle system 2. The buckle system 2 is configured as part of a watch with watch straps 92 connected on either side of the mounting bracket 50 by pairs of coupling devices 90. Furthermore, the portable media player may be a touch-screen 18 which is enabled with a variety of functions. For example, the touch-screen 18 of the portable media player may be able to show the time, access the Internet, and display a listing of song titles. In such a preferred embodiment, the bracket body 52 of the mounting bracket 50 may be formed to provide access to certain features or additional components of the portable media player when mated to the mounting bracket 50. For example, buttons 14, input 16 and other components (such as an earphone jack/plug) of the mounting clip 10 may be accessible to a user when the portable media player 10 (i.e. mounting clip 10) is mated to the mounting bracket 50.

In another embodiment, the mounting bracket 50 may be incorporated onto the handlebars of a bike (not shown). If the mounting clip 10 comprises a computer such as in FIG. 6 the mounting bracket 50 may allow the computer to be mounted for easy access on the handlebars. Other uses incorporating the mounting bracket 50 are possible. The embodiments described herein should not be construed as limiting.

It should be understood that the mounting clip 10 and the mounting bracket 50 may be constructed using known construction techniques. For example, the mounting bracket 50 may be made of a plastic or a polymer and constructed using an injection molding process. Other materials and processes are also possible. For example, the mounting bracket may be made of metal and may be manufactured using a computer numerical controlled (CNC) process, and the like. The manufacturing process used to construct the mounting clip 10 and/or mounting bracket 50 should not be construed as limiting.

Although this disclosure has described and illustrated certain preferred embodiments of the invention, it is also to be understood that the invention is not restricted to these particular embodiments. Rather, the invention includes all embodiments which are functional, or mechanical equivalents of the specific embodiments and features that have been described and illustrated herein.

It will be understood that, although various features of the invention have been described with respect to one or another of the embodiments of the invention, the various features and embodiments of the invention may be combined or used in conjunction with other features and embodiments of the invention as described and illustrated herein.

The embodiments of the invention in which an exclusive property or privilege is claimed is defined as follows:

1. A buckle system comprising:
   a mounting bracket comprising a bracket body, a slot and a groove,
      wherein the bracket body has a first surface and a second surface opposite the first surface, and
      wherein the slot and the groove are formed in the bracket body; and
   a mounting clip for mechanically coupling to the mounting bracket, the mounting clip comprising a clip body, a latching mechanism and a tongue,
      wherein the clip body is connected to the latching mechanism by the tongue;
      wherein the tongue of the mounting clip is operable to slide into the groove formed in the bracket body of the mounting bracket such that the latching mechanism is adjacent the first surface of the bracket body and the clip body is adjacent the second surface of the bracket body opposite the first surface;
      wherein a hook of the latching mechanism is operable to be received by the slot formed in the bracket body once the tongue of the mounting clip is slideably received into the groove of the mounting bracket;
      wherein the latching mechanism forms a lever and the tongue of the mounting clip acts as a fulcrum such that the latching mechanism pivots about the tongue of the mounting clip about an axis formed by the tongue;
      wherein the mounting clip further comprises a spring,
      wherein the latching mechanism is operable in an open position and a closed position,
      wherein the latching mechanism of the mounting clip is spring-loaded to bias the latching mechanism in the closed position;
      wherein the mounting bracket further comprises a depression in the first surface of bracket body,
      wherein the depression is located adjacent the groove and is towards the first end of the bracket body,
      wherein a tongue end of the latching mechanism is operable to be biased towards the clip body of the mounting clip when the latching mechanism is in the open position, and
   wherein the depression is operable to allow for an increase in an angle formed between the latching mechanism, the tongue and the clip body, when in the open position, by providing clearance for the tongue end of the latching mechanism.

2. The buckle system of claim 1, wherein the depression at least partially conforms to the path taken by the tongue end of the latching mechanism when biased from the closed position to the open position.

3. A mounting bracket for mating with a mounting clip, the mounting bracket comprising:
   a bracket body operable to mechanically couple to the mounting clip, the mounting clip having a clip body and a latching mechanism connected to the clip body by a tongue,
   wherein the bracket body has a first surface and a second surface opposite the first surface;
   a groove in the bracket body operable to slideably receive the tongue of the mounting clip, wherein the groove is spaced towards a first end of the bracket body; and
   a slot in the bracket body operable to receive a hook of the latching mechanism, wherein the slot is spaced towards a second end of the bracket body;
   wherein the bracket body has a first end and a second end opposite to the first end,
   wherein the groove is spaced towards the first end;
   wherein the slot is spaced towards the second end;
   wherein the mounting bracket further comprises:
   a depression in the first surface of the bracket body operable to provide clearance for the latching mechanism when in an open position,
      wherein the depression is located adjacent to the groove and is spaced towards the first end of the bracket body, and wherein the groove is located between the depression and the slot.

4. The mounting bracket of claim 3, wherein the depression is asymmetric about a central transverse axis and runs deeper into the first surface of the bracket body on a side of the transverse axis spaced towards the first end of the bracket body.

\* \* \* \* \*